United States Patent
Chen et al.

(10) Patent No.: US 9,942,272 B2
(45) Date of Patent: Apr. 10, 2018

(54) HANDLING OUT OF ORDER EVENTS

(71) Applicant: Microsoft Technology Licensing, LLC, Redmond, WA (US)

(72) Inventors: Zhong Chen, Medina, WA (US); Lev Novik, Bellevue, WA (US); Boris Shulman, Bellevue, WA (US); Clemens A. Szyperski, Sammamish, WA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 111 days.

(21) Appl. No.: 14/732,398

(22) Filed: Jun. 5, 2015

(65) Prior Publication Data
US 2016/0359910 A1    Dec. 8, 2016

(51) Int. Cl.
*H04L 29/06* (2006.01)
*G06F 17/30* (2006.01)

(52) U.S. Cl.
CPC ........ *H04L 63/20* (2013.01); *G06F 17/30303* (2013.01); *G06F 17/30699* (2013.01); *H04L 63/10* (2013.01)

(58) Field of Classification Search
CPC ... H04L 63/20; H04L 63/10; G06F 17/30303; G06F 17/30699
USPC .................................. 726/1, 2, 26
See application file for complete search history.

(56) References Cited

U.S. PATENT DOCUMENTS

| | | | |
|---|---|---|---|
| 5,625,788 A | 4/1997 | Boggs et al. | |
| 5,696,958 A * | 12/1997 | Mowry | G06F 9/3804 712/23 |
| 5,721,855 A | 2/1998 | Hinton et al. | |
| 5,889,982 A | 3/1999 | Rodgers et al. | |
| 6,128,649 A * | 10/2000 | Smith | H04N 7/152 348/14.03 |
| 6,449,618 B1 | 9/2002 | Blott et al. | |
| 6,516,310 B2 | 2/2003 | Paulley | |

(Continued)

FOREIGN PATENT DOCUMENTS

| WO | 2014052917 A1 | 4/2014 |
|---|---|---|
| WO | 2015070232 A1 | 5/2015 |

OTHER PUBLICATIONS

"International Search Report and Written Opinion Issued in PCT Application No. PCT/US2016/035611", dated Sep. 14, 2016, 15 Pages.

(Continued)

*Primary Examiner* — Sarah Su (57) ABSTRACT

Processing streaming data in accordance with policies that group data by source, enforce a maximum permissible late arrival value for streaming data, a maximum permissible early arrival for data and/or a maximum degree to which data can be out of order and still be compliant with the out of order policy is described. The correct starting point for reading a data stream so as to produce correct output from a given output start time can be enabled using the early arrival policy. Using combinations of policies, output can be generated promptly (with low latency). When input from a given source is not disrupted, output can be generated with low latency. Output can be generated even when the input stops by applying a late arrival policy.

20 Claims, 4 Drawing Sheets

(56) References Cited

U.S. PATENT DOCUMENTS

| | | | |
|---|---|---|---|
| 6,625,150 B1* | 9/2003 | Yu | H04L 47/10 370/230 |
| 6,820,121 B1 | 11/2004 | Callis et al. | |
| 7,010,538 B1 | 3/2006 | Black | |
| 7,251,747 B1 | 7/2007 | Bean et al. | |
| 7,603,488 B1 | 10/2009 | Gravenstein et al. | |
| 7,680,830 B1 | 3/2010 | Ohr et al. | |
| 7,738,380 B1* | 6/2010 | Dubrovsky | H04L 12/583 370/235 |
| 7,769,015 B2* | 8/2010 | Huang | H04L 49/90 370/389 |
| 8,001,309 B2 | 8/2011 | Patzelt et al. | |
| 8,219,848 B2 | 7/2012 | Branson et al. | |
| 8,392,381 B2 | 3/2013 | Al-Kateb et al. | |
| 8,417,690 B2 | 4/2013 | Poppe et al. | |
| 8,797,867 B1* | 8/2014 | Chen | H04L 41/5022 370/232 |
| 8,812,487 B2 | 8/2014 | Krishnamurthy et al. | |
| 8,949,194 B1 | 2/2015 | Mehlum et al. | |
| 8,949,801 B2 | 2/2015 | Andrade et al. | |
| 2002/0010804 A1 | 1/2002 | Sanghvi et al. | |
| 2004/0103256 A1* | 5/2004 | Flores | G06F 9/3863 711/159 |
| 2005/0281279 A1* | 12/2005 | Dennison | H04L 12/5693 370/412 |
| 2006/0004597 A1* | 1/2006 | Charters | G06Q 10/10 705/7.11 |
| 2006/0143170 A1 | 6/2006 | Ganguly et al. | |
| 2006/0195309 A1* | 8/2006 | Stokkan | G06N 5/04 703/17 |
| 2007/0180533 A1* | 8/2007 | Ramaiah | H04L 45/54 726/26 |
| 2008/0005391 A1 | 1/2008 | Gedik et al. | |
| 2008/0270640 A1 | 10/2008 | Gedik et al. | |
| 2009/0157895 A1 | 6/2009 | VanDenBerghe | |
| 2009/0307053 A1* | 12/2009 | Steelberg | G06Q 10/10 705/7.29 |
| 2010/0049973 A1* | 2/2010 | Chen | H04L 9/083 713/163 |
| 2010/0254462 A1 | 10/2010 | Friedrich et al. | |
| 2012/0005564 A1 | 1/2012 | Tsubaki | |
| 2013/0132978 A1 | 5/2013 | Opher et al. | |
| 2013/0166617 A1 | 6/2013 | Branson et al. | |
| 2014/0016501 A1* | 1/2014 | Kamath | H04L 69/22 370/253 |
| 2014/0201225 A1 | 7/2014 | Deshmukh et al. | |
| 2014/0215184 A1 | 7/2014 | Branson et al. | |
| 2014/0226469 A1* | 8/2014 | Stewart | H04L 47/12 370/230 |
| 2015/0134796 A1* | 5/2015 | Theimer | G06F 17/30569 709/223 |
| 2017/0012861 A1* | 1/2017 | Blumenthal | H04L 45/24 |

OTHER PUBLICATIONS

Babu, et al., "Exploiting k-Constraints to Reduce Memory Overhead in Continuous Queries over Data Streams", In Proceedings of ACM Transactions on Database Systems (TODS), vol. 29 Issue 3, Sep. 2004, 28 pages.

Ding, et al., "MJoin: A Metadata•Aware Stream Join Operator", In Proceedings of the 2nd International Workshop on Distributed Event-Based Systems, Jun. 8, 2003, 8 pages.

Dash, et al., "Delivering QOS in Xml Data Stream Processing Using Load Shedding", In Proceedings of International Journal of Database Management Systems, vol. 4, Issue.3, Jun. 2012, 23 pages.

Gu, et al., "Adaptive Load Diffusion for Stream Joins", In Proceedings of the ACM/IFIP/USENIX International Conference on Middleware, Nov. 2005, 10 pages.

Ananthanarayanan, et al., "Photon: Fault-tolerant and Scalable Joining of Continuous Data Streams", In Proceedings of ACM SIGMOD International Conference on Management of Data, Jun. 22, 2013, 12 pages.

Asha, et al., "Adaptive Join Operators for Result Rate Optimization on Streaming Inputs", In Proceedings of International Journal of Engineering Trends and Technology, May 2011, 5 pages.

"SAS® Event Stream Processing Engine", Published on: Nov. 12, 2014 Available at: http://www.sas.com/content/dam/SAS/en_us/doc/factsheet/event-stream-processing-engine-106151.pdf, 4 pages.

Li, et al., "Event Stream Processing with Out-of-Order Data Arrival", In Proceedings of the 27th International Conference on Distributed Computing Systems Workshops, Jun. 22, 2007, 8 pages.

Keckler, et al., "Concurrent Event Handling Through Multithreading", In Proceedings of IEEE Transactions on Computers, vol. 48, Issue 9, Sep. 1999, 14 pages.

Heinze, et al., "Latency-Aware Elastic Scaling for Distributed Data Stream Processing Systems", In Proceedings of the 8th ACM International Conference on Distributed Event-Based Systems, May 26, 2014, 10 pages.

Francisci Morales, Gianmarco De, "Distributed Stream Processing Showdown: S4 vs Storm", Published on: Jan. 2, 2013 Available at: http://gdfm.me/2013/01/02/distributed-stream-processing-showdown-s4-vs-storm/, 5 pages.

Akidau, et al., "MillWheel: Fault-Tolerant Stream Processing at Internet Scale", In Proceedings of the VLDB Endowment, vol. 6, Issue 11, Aug. 26, 2013, 12 pages.

Hwang, et al., "High-Availability Algorithms for Distributed Stream Processing", In Proceedings of the 21st International Conference on Data Engineering, Apr. 5, 2005, 12 pages.

Hu, et al., "ELF: Efficient Lightweight Fast Stream Processing at Scale", In Proceedings of USENIX ATC Annual Technical Conference, Jun. 19, 2014, 13 pages.

Brito, et al., "Scalable and Low-Latency Data Processing with Stream MapReduce", In Proceedings of IEEE Third International Conference on Cloud Computing Technology and Science, Nov. 29, 2011, 15 pages.

Hwang, et al., "A Comparison of Stream-Oriented High-Availability Algorithms", In Technical Report, Jun. 5, 2003, 13 pages.

Kamburugamuve, Supun, "Survey of Distributed Stream Processing for Large Stream Sources", In Technical Report, Dec. 14, 2013, 16 pages.

"Samza", Retrieved on: Jun. 5, 2015, Available at: http://samza.apache.org/learn/documentation/0.7.0/container/checkpointing.html, 4 pages.

Bockermann, Christian, "A Survey of the Stream Processing Landscap", In Technical Report, May 16, 2014, 47 pages.

Branson, et al., "CLASP: Collaborating, Autonomous Stream Processing Systems", In Proceedings of ACM/IFIP/USENIX 8th International Middleware Conference, Nov. 26, 2007, 20 pages.

Sattler, et al., "Towards Elastic Stream Processing: Patterns and Infrastructure", In Proceedings of the First International Workshop on Big Dynamic Distributed Data, 14 pages.

Liu, et al., "SAND: A Fault-Tolerant Streaming Architecture for Network Traffic Analytics", In Proceedings of 44th Annual IEEE/IFIP International Conference on Dependable Systems and Networks, Jun. 23, 2014, 8 pages.

"Azure Stream Analytics Developer Guide", Retrieved on: Apr. 8, 2015 Available at: http://azure.microsoft.com/en-in/documentation/articles/stream-analytics-developer-guide/.

Mumian, et al., "Introduction to Azure Stream Analytics", Published on: Mar. 21, 2015 Available at: http://azure.microsoft.com/en-us/documentation/articles/stream-analytics-introduction/.

"International Search Report and Written Opinion Issued in PCT Application No. PCT/U52016/035610", dated Sep. 5, 2016, 13 Pages.

Gedik, et al., "GrubJoin: An Adaptive, Multi-Way, Windowed Stream Join with Time Correlation-Aware CPU Load Shedding", In Proceedings of IEEE Transactions on Knowledge and Data Engineering, vol. 19, Issue 10, Oct. 2, 2007, pp. 1363-1380.

Srivastava, et al., "Memory-Limited Execution of Windowed Stream Joins", In Proceedings of the Thirtieth International Conference on Very Large Databases, vol. 30, Aug. 31, 2004, pp. 324-335.

Das, et al., "Approximate Join Processing Over Data Streams", In Proceedings of the ACM SIGMOD International Conference on Management of Data, Jun. 9, 2003, pp. 40-51.

(56) References Cited

OTHER PUBLICATIONS

Xie, et al., "A Survey of Join Processing in Data Streams.", In Proceedings of Springer Data Streams, vol. 31, Apr. 2, 2007, pp. 209-236.
"USPTO Non-Final Office Action", dated Apr. 7, 2017, U.S. Appl. No. 14/732,416, filed Jun. 5, 2015, pp. 8.
"USPTO Non-Final Office Action", dated Jan. 12, 2017, U.S. Appl. No. 14/732,374, filed Jun. 5, 2015, pp. 7.
"USPTO Notice of Allowance", dated Jun. 2, 2017, U.S. Appl. No. 14/732,374, filed Jun. 5, 2015, pp. 5.
"International Preliminary Report on Patentability Issued in PCT Application No. PCT/US2016/035610", dated May 29, 2017, 7 Pages.

* cited by examiner

HANDLING OUT OF ORDER EVENTS

CROSS-REFERENCE TO RELATED APPLICATIONS

The application is related in subject matter to co-pending U.S. patent application Ser. No. 14/732,416 entitled "USING ANCHORS FOR RELIABLE STREAM PROCESSING", filed or Jun. 5, 2015. The application is related in subject matter to co-pending U.S. patent application Ser. No. 14/732,374entitled "STREAMING JOINS IN CONSTRAINED MEMORY ENVIRONMENTS", filed on Jun. 5, 2015.

BACKGROUND

In traditional computing a single central processing unit (CPU) sequentially executes a single instruction on a single piece of data in a single stream, executing one operation at a time. As the data processing demands of the world increased, the amount of data to be operated upon exploded.

In stream processing multiple data streams from multiple sources can be processed in real time. "Streaming" or stream processing means receiving streams of data, processing the data and streaming it back out as a single flow.

SUMMARY

Processing streaming data in accordance with one or more policies can enable a data stream to be read starting at a point that produces output starting at a specified output start time. Application of one or more policies can enable data streams with low levels of disruption to be output with low latency. Application of one or more policies can enable the continuation of generation of output when data from a data source stops arriving. Application of one or more policies can enable persisted state for data sources that no longer produce data to be discarded. Application of one or more policies can enable parallel processing without allowing parallelism to affect the end results.

A policy for grouping data by the source of the data can be specified. For example the policy for processing data emanating from the one source (e.g., in one sub-stream) can be applied separately than the policy for processing the same kind of data emanating from a second source. A policy concerning the maximum permissible early arrival of data can be specified. The maximum permissible early arrival value can be the maximum value by which data can arrive early and still be in compliance with the early arrival policy. A policy concerning the maximum permissible late arrival of events can be specified. The maximum late arrival value can be the maximum value by which data can arrive late and still be in compliance with the late arrival policy. A policy concerning the maximum out of order amount can be specified, that is, the maximum value of time by which events in the same group or sub-stream may arrive out of order can be specified. Data can be ingested from one or more data streams where each unit of data in the data stream is associated with a time having logical relevance to the data itself and a time at which the unit of data arrives at a computing device. The data can be evaluated for compliance or non-compliance with the one or more policies. A non-compliance action can be applied to noncompliant data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Some stream processing systems process data according to the time when the data arrives at the processing node. Other stream processing systems process data according to some other time, such as, for example, for event data, the time at which the event occurred.

In accordance with aspects of the subject matter described herein, data can be ingested from one or more data streams where each unit of data in the data stream is associated with a time having logical relevance to the data itself (referred to herein as the associated time of the unit of data) and a time at which the unit of data arrives at a computing device (referred to herein as the arrival time of the unit of data). The associated time can be a time at which the data originated or can be any other suitable time that has relevance to the data itself. For example, the associated time for an event can be the time the event occurred. The arrival time has no logical relevance to the data itself. For example, the arrival time of an event does not affect the meaning of the data. Whether an event representing a temperature reading of a computer at 2 pm arrives at 2 pm or 4 pm does not change the temperature reading or when the reading occurred. A computer that processes the data of one or more data streams typically ingests data as it arrives, i.e., in sequence by arrival time. It is possible and in some cases almost certain, that at least some units of data will arrive at a computing device out of order, that is, in a different sequence than the sequence that would occur if the data were put in sequence by associated time. Because arrival time can and often does differ from associated time, it can be difficult to know when all of the data or events for a given time period have finished arriving.

Ingestion of data in arrival sequence instead of in sequence by associated time can result in the following. A unit of data (e.g., an event) can arrive early, that is, it can have an associated time that is greater than the arrival time. For example, an event with an associated time that is the time the event occurred (e.g., 2 pm) can arrive at a processing node at 1:30 pm (arrival time is 1:30 pm). This may happen because the clocks of the computing device that generated the associated time and the computing device that received the data are not synchronized. Because units of data can arrive early, data can arrive out of out of order, that is, not in sequence with respect to associated time.

A unit of data can arrive late, that is, it can have an associated time that is less than the arrival time of the unit of data. For example, an event with an associated time that is the time the event occurred (e.g., 2 pm) can arrive at a computing node some time later (e.g., at 2:05 pm). This can occur because of network delay or for other reasons. This is typically quite common Because units of data can arrive late, data can arrive out of out of order, that is, not in sequence with respect to associated time. For example, suppose one event that occurred at 2 pm arrives at the processing node at 2:05. Now suppose another event that occurred at 1:59 pm arrives at 2:06 pm. These two events are out of sequence with respect to the associated time and are in sequence by arrival time of the events. One common reason that this happens is because the same type of data arriving at a computing device can be sent from multiple senders. As used herein the "same type of data" means data that is relevant to the particular job being performed. It will be appreciated by those of skill in the art that only a subset of input data contributes to the computation of each unit of output data. As used herein, "relevant" data is that subset of input data that contributes to the computation of each unit of output data.

How out of order units of data from one sender are, can be different than how out of order units of data from another sender are, even though the type of data sent can be the same. For example, typically all the data sent from a single sender arrives in sequence by associated time order (e.g., because the data is sent sequentially) or almost in order. The same type of data sent from different senders is likely to arrive out of order (e.g., because the clocks of the different senders are not synchronized and/or because the network delay varies from one sender to another or for other reasons).

To address at least these issues, one or more policies comprising several different aspects of stream processing can be applied to the stream processing of data. An early arrival policy can establish a limit on how early data can arrive and still be compliant with the early arrival policy. A late arrival policy can establish a limit on how late data can arrive and still be compliant with the late arrival policy. An out of order policy can establish a limit to how out of sequence by associated time data can be and still be compliant with the out of order policy. Finally, a policy for processing the same type of data can be applied separately to data emanating from one source and data emanating from another source.

Handling Out of Order Events

Figure 1:
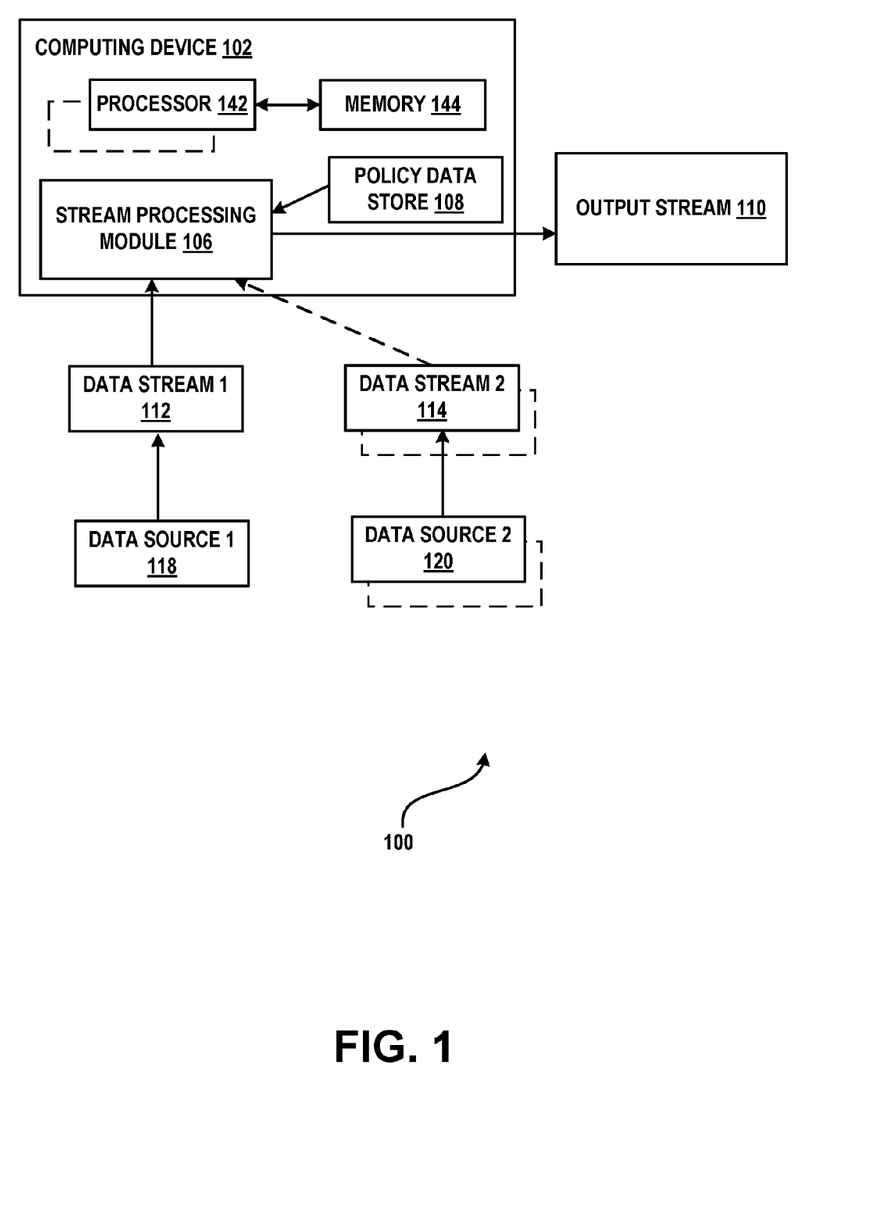
FIG. 1 illustrates an example of a system 100 comprising an example of a system that handles out of order data in accordance with aspects of the subject matter described herein.

FIG. 1 illustrates an example of a system 100 that handles out of order data in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud.

System 100 can include one or more computing devices such as, for example, computing device 102. Contemplated computing devices include but are not limited to desktop computers, tablet computers, laptop computers, notebook computers, personal digital assistants, smart phones, cellular telephones, mobile telephones, sensors and so on. A computing device such as computing device 102 can include one or more processors such as processor 142, etc., and a memory such as memory 144 that communicates with the one or more processors. Computing device 102 may be a device that operates in a constrained memory environment. A constrained memory environment is an environment in which the available memory is not sufficient to handle the processing demands with which it is faced using traditional processing.

System 100 may include one or more program modules that when loaded into the memory cause the at least one processor to perform the processing attributed to the one or more program modules. System 100 may include one or more program modules comprising: one or more program modules (e.g., stream processing module 106) that process streaming data in accordance with specified policies. System 100 may include a stream processing policy data store, represented in FIG. 1 as policy data store 108. Stream processing module 106 may receive a data stream such as a first data stream (e.g., data stream 1 112). One or more additional data streams such as a second data stream (e.g., data stream 2 114), etc., may also be received and processed. Data in the data streams may be event data, complex event data, data from databases or any type of data. For example, streaming data can be structured data, security data, measurement data, (e.g., data from a temperature sensing device), sensor data, log data and so on.

Stream processing module 106 may process data from one or more data streams to produce an output stream such as output stream 110. When data arrives at the computing device 102 (the computing node), the data can be written to a queue in arrival time order. Data can be real time data received in real time or recorded real time data. Data from the first data stream may originate from a first data source (e.g., data source 1 118). Data from a second data stream may originate from a second data source (e.g., data source 1 120) and so on. Data sources may reside on the same computing device as stream processing module 106 or on a different computing device. Similarly, a first data source and a second data source may reside on the same computing device, on a different computing device and so on Data from the one or more data streams can be processed in accordance with policies stored in a stream processing policy data store such as policy data store 108. Policy data store 108 can include one or more of the stream processing policies described below.

Early Arrival Policy

Typically data in a data stream that arrives at a processing node is appended to the end of a queue. Data can be read from the queue and processed in arrival time order. In accordance with aspects of the subject matter described herein, a request for processing data can specify a time at which to start producing output. Suppose, for example, that a request is received to start producing output starting at a specified time of 2 pm. An input anchor can be used to determine where in the queue to start reading from. An input anchor (an anchor into an input file) can represent a (physical) point in the queue from which data is pulled. If, in response to the request, all the data that arrives at or after the specified time is read and processed, it is very likely that some data will have an associated time that is before the specified time (e.g., before 2 pm). This data can be filtered out. If only the data that arrived at or after the specified time (e.g., at or after 2 pm) is read, some data with an associated date that is after the specified time (e.g., the associated time is at or after 2 pm) will be missed because the data arrived before the specified time (e.g., before 2 pm). However, this data should have been processed because the time associated with the data is at or after the time specified in the request.

To address this problem, in accordance with some aspects of the subject matter described herein, typically, when data starts to be read from the queue, an early arrival policy can be applied to the data of the data streams. An early arrival policy can establish a limit (a maximum permissible early arrival value) on how early data can arrive and still be compliant with the early arrival policy. A value for the maximum permissible early arrival can be specified. The maximum permissible early arrival value can be supplied by a user or requestor of the output. A desired start time for producing output can be specified. A working start time W in accordance with the specified start time and the early arrival policy can be determined by subtracting the maximum permissible early arrival value M from the specified start time R. Input can be read from the queue starting at the working start time W. Each unit of data can be evaluated for compliance with the early arrival policy by determining if the associated time X of the unit of data exceeds its arrival time T by an amount that exceeds the maximum permissible early arrival value M. If it does, the unit of data is noncompliant. If it does not, the unit of data is compliant. In response to determining that the unit of data is noncompliant, one or more noncompliance actions (e.g., discarding the unit of data) can be taken.

For example, a particular early arrival policy may specify that no data can arrive more than a maximum of 20 minutes early (M=20 minutes). In this example in accordance with aspects of the subject matter described herein, if a request to start reading at 2 pm is received, the arrival queue can be read starting at 1:40 pm. In this example 1:40 pm is the starting work time determined by evaluating the result of R (2 pm)–M (20 minutes) to get W (1:40 pm). The queue can be read starting at an arrival time of W (1:40 pm). Any data that is read that has an associated time that is before the requested start time (2 pm) will be discarded and any data having an associated time of 2 pm or later will be processed.

Late Arrival Policy

A late arrival policy can establish a limit (a maximum permissible late arrival value) on how late data can arrive and still be compliant with the late arrival policy. The maximum permissible late arrival value L can be specified. The maximum permissible late arrival value L can be supplied by a user or requestor of the output. Each unit of data can be evaluated for compliance with the late arrival policy by determining if the arrival time A of the unit of data exceeds the associated time X of the unit of data by an amount that exceeds the maximum permissible late arrival value L. Evaluating for compliance with the late arrival policy can be performed one unit of data at a time, by comparing how late the data arrived (the result of calculating the arrival time minus the associated time) with a maximum late arrival amount. If the result exceeds the maximum permissible late arrival value, the unit of data is noncompliant. If the result does not exceed the maximum permissible late arrival value, the unit of data is compliant.

In response to determining that the unit of data is noncompliant, one or more noncompliance actions can be taken. Contemplated late arrival policy noncompliance actions include processing the unit of data as is, dropping (not processing) the unit of data or adjusting the associated time of the unit of data to comply with the late arrival policy. In accordance with some aspects of the subject matter described herein the associated time can be adjusted minimally, so that it just barely meets the compliance criteria. Minimally adjusting the associated time may have a lesser effect on the meaning of the data than a greater adjustment would. To make an event that is non-compliant with the late arrival policy compliant, the maximum late arrival amount can be subtracted from the arrival time of the non-compliant event and the time associated with the noncompliant unit of data can be set to the difference.

For example, suppose a unit of data arrives at a computing device at 2:21 pm (A=2:21 pm) and the associated time of the unit of data is 2 pm. A late arrival policy can specify that if the time the unit of data arrives (A) is more than a maximum permissible late amount L of 20 minutes after the associated time data of the unit of data, the data violates the late arrival policy. Because the associated time is 2 pm, the latest compliant unit of data can arrive no later than 2:20 pm. Because 2:21 pm is after 2:20 pm, this unit of data is non-compliant. The late arrival policy can be used to generate output in the absence of input. For example, suppose a requestor asks to be notified when no events have occurred in the previous 10 minutes. The late arrival policy can allow the output to be sent when the time period (10 minutes) and the maximum permissible late arrival time have been reached.

Out of Order Policy

An out of order policy can establish a limit, a value that represents a maximum permissible amount that data can be out of order and still be compliant with the out of order policy. This value establishes how out of sequence by associated time data can be and still be compliant with the out of order policy. This value is referred to herein as the maximum permissible time variance. The maximum permissible time variance T can be specified. The maximum permissible time variance T can be supplied by a user or requestor of the output. Each unit of data can be evaluated for compliance with the out of order policy by determining if a first unit of data arrived after a second unit of data with an associated time that precedes the associated time of the first unit of data by at least the maximum permissible time variance T. If so, the first unit of data is noncompliant and the second unit of data is compliant.

Evaluating for compliance with the out of order policy would be expected to require looking at all the other units of data in the data stream, and to require all those units of data to be stored. In contrast, in accordance with aspects of the subject matter described herein, only the unit of data H that has arrived having the largest (latest) associated time has to be stored and examined.

Each unit of data can be evaluated for compliance with the out of order policy as follows. A unit of data E having an associated time X and an arrival time of Y1 is noncompliant with the out of order policy if another unit of data D with an arrival time of Y2 has arrived and the arrival time Y2 of the unit of data D is prior to the arrival of the unit of data E (that is, Y2<Y1). However, the unit of data having the largest (latest) associated time has already been stored and it is the unit of data H. If X+T is greater than the associated time of H, the unit of data E is noncompliant. If X+T is not greater than the associated time of H, the unit of data E is compliant. In response to determining that the unit of data E is non-compliant, one or more noncompliance actions (e.g., drop E or adjust the associated time of E) can be taken. Thus, it will be appreciated that evaluating for compliance with the out of order arrival policy can be performed one unit of data at a time, by comparing it to one stored value, thereby vastly reducing the amount of memory or other storage used.

An out of order policy can be applied to the data of one or more data streams. The out of order policy can state that if a first unit of data arrives after a second unit of data that was sent a maximum out of order amount earlier, the first unit of data is out of compliance. For example, suppose 20 minutes is the maximum permissible time variance 0. Suppose the data comprises event data. Suppose event 1 arrives after event 2, where event 2 was sent 20 minutes earlier. Event 2 is in compliance with the out of order policy but event 1 is non-compliant. In response to determining that the unit of data is noncompliant with the out of order policy, one or more noncompliance actions can be taken. Contemplated out of order policy noncompliance actions include processing the unit of data as is, dropping (not processing) the unit of data or adjusting the associated time of the unit of data to comply with the out of order policy. In accordance with some aspects of the subject matter described herein the associated time can be adjusted minimally, so that it just barely meets the compliance criteria. This can affect the meaning of the data less than a greater adjustment.

To make a unit of data that is non-compliant with the out of order policy compliant, the maximum permissible time variance value can be subtracted from the received unit of data event having the latest sent time. For example, suppose out of order policy compliant data is no more than 10 minutes out of order. Suppose the received event having the latest send time has a send time of 2:15. Now suppose an event with a sent time of 2 pm arrives. The event with the sent time of 2 pm can be adjusted to 2:05 so that is just compliant. The time to which the event send time is adjusted is not affected by the current time. Any event sent before the latest send time+the policy amount will be adjusted so that is just compliant. Early-arrival non-compliant data cannot be adjusted. It will be appreciated that the out of order policy described herein can dramatically reduce the amount of memory that is needed because time can be moved forward.

Combinations of Policies

Combining more than one policy can provide unexpected advantages. For example, suppose that all the units of data in a particular data stream take 2 hours to arrive. That is, arrival time of a unit of data exceeds associated time of the unit of data by 2 hours. Suppose all the units of data arrive in sequence by associated time. Thus, if the associated time of a first unit of data precedes the associated time of a second unit of data, the first unit of data will arrive before the second unit of data and consequently will have an arrival time that precedes the arrival time of the second unit of data. Suppose the late arrival policy states that all data must arrive within 20 minutes of the associated time to be compliant with the late arrival policy. That is the maximum permissible late arrival value is 20 minutes. The units of data described above that take 2 hours from associated time to arrive are noncompliant with the late arrival policy. However, evaluation by the out of order policy will find these events compliant with the out of order policy because although all the events are late they are in sequence by associated time. The maximum permissible time variance for this data is 0.

Now, suppose in addition to enforcement of a late arrival policy, an out of order policy is in effect. That is, a combination of the late arrival policy and the out of order policy are applied. Suppose, as in the above example the maximum permissible late arrival policy says compliant data may arrive up and including 2 hours late. That is, the maximum permissible late arrival is 2 hours. Because compliant data can be received up to and including 2 hours late, output cannot be produced (and sent to a requester) until the full 2 hours has passed. That is, the amount of time that has to pass before output can be produced in response to a request is the maximum permissible late arrival value, because only when the full 2 hours has elapsed can it be guaranteed that all the output requested has been received. Suppose a user asks for a count of events that occur in any given minute. Suppose it is now 2 pm. Suppose that a number of events have arrived and have been counted. It would be useful to able to output the number of events arriving between 2:00 and 2:01 pm as soon as possible after 2:01 pm. However, because of the maximum permissible late arrival being 2 hours, output cannot be produced until an amount of time equal to the maximum permissible late arrival has elapsed. That is, finally, right after 4:01 pm, the output can be produced.

Now suppose that in addition to the late arrival policy, an out of order policy enforces a maximum permissible time variance value of 1 minute and the late arrival policy still enforces a maximum permissible late arrival value of two hours. It is possible that late arrival policy compliant events can be received up to and including two hours late, so that if the late arrival policy were in effect but the out of order policy was not in effect, output cannot be released until right after 4:01 pm. Suppose the current time is now 2 pm and a maximum permissible time variance value of 1 minute is in effect. When an event associated with a time greater than 2:02 pm is received (i.e., the time period for the requested processing is from 2:00 pm to 2:01 pm) the results for the one minute starting at 2 pm and ending at 2:01 pm can be output immediately after 2:02 pm because the maximum permissible time variance is 1 minute, guaranteeing that no more compliant out of order events will be received having an associated time from 2 pm to 2:01 pm, after 2:02.

The combination of enforcement of an out of order policy and a late arrival policy can be used to confirm that a particular time has been reached (referred to herein as "moving time forward") in the absence of receiving an explicit conformation that the particular time has been reached. If only an out of order policy is enforced, time to cannot be moved forward. Suppose a maximum permissible time variance value of 1 minute is in effect. Suppose a user asks for a count of events that occur each minute. Suppose a number of events for the time period of 1:59 to 2:00have arrived and have been counted. Suppose the last event received has an associated time of 1:59:30pm. The output can not be sent to the requestor because an event with an associated time of, for example, 1:59:40 can still be received, regardless of the how long the data takes to get there. In fact, no matter how long is waited, the output can never be produced until the out of order policy is violated because the out of order policy only guarantees that the data will only be out of order within a specified time variance. It says nothing about how late the data can be. This means that until an event with an associated time that exceeds the maximum permissible time variance is received or until an explicit notification has been received indicating that either a particular time has been reached or until the out of order policy is violated, the output never be released.

However, when in addition to an out of order policy, a late arrival policy is in effect as soon as the maximum permissible maximum late arrival value has been reached, the output can be released.

Grouping

A policy can be applied separately to different sub-streams within the same data stream. For example, an out of order policy with a maximum permissible time variance of 1 second can be applied separately to group 1 and separately to group 2 instead of applying the out of order policy with a maximum permissible time variance of 1 second to data units that include data units from both group 1 and data units from group 2.) Grouping groups data from one sub-stream of a data stream together and groups data from another sub-stream of the data stream together. The out of order policy can be applied separately to the first group and can be applied separately to the second group. For example, suppose an event is noncompliant with the out of order policy if any other event from any other sub-stream that is newer (later in time) has arrived at the computing node. Doing so will cause a lot of events to be considered noncompliant. Alternatively, applying the out of order policy separately to each group enables an event to only be noncompliant if an event from the same group has arrived and the criteria for noncompliance has been met.

Suppose, for example, that all the data from a first sub-stream are very close to being exactly on time (associated time is only 1 second less than arrival time) and the data within the sub-stream is completely in order by associated time. Suppose that for the data from a second sub-stream, associated time is an hour less than arrival time. (That is, there is a one hour delay from the time the data was sent/generated to the time the data arrives.) Suppose this data is also exactly in order by associated time. If the out of order policy is applied separately to the data of each of the sub-streams, the out of order policy will find the data from both sub-streams in compliance with the out of order policy. If the out or order policy is applied to the whole set of data, that is, the data from both sub-streams are evaluated for compliance together, many of the events from the second sub-stream will be noncompliant because by the time the data from the second sub-stream arrives, up to an hour's worth of events from the first sub-stream will have already arrived. Thus applying an out of order policy separately to separate sub-streams will have dramatically different results than applying the same out of order policy to the whole set of data.

In accordance with some aspects of the subject matter described herein, "group" refers to the ingestion endpoint partition at which the data arrives at. For example, all the data that arrives at a particular partition belongs to the same group. A partition can be a particular virtual machine running on a particular server, for example. Other definitions of "group" are contemplated. For example, a group may be defined as the data that arrives at a particular cluster (using cluster ID) or computing device (e.g. machine ID). Group may be defined by the user. Allowing the out of order policy to be applied separately on a sub-stream can allow a very small maximum out of order time variance to be specified for data from a sub-stream because typically the sub-stream from a single sender is more uniform, enabling the events to be processed a lot faster.

When sub-streams are used the late arrival policy can be established globally (the same late arrival policy is used for all the different sub-streams but is applied separately). This approach is advantageous because the approach eliminates the need to maintain a lot of state. If the data stream has many sub-streams, a lot of state has to be maintained. For example, for each sub-stream at least the send time of the last received event has to be stored. This can be problematic because over time the number of sub-streams encountered can become very large so the state that is maintained for them will become very large. For example, by applying the global late arrival policy to the saved state, the data associated with the unit of data having the largest (latest) associated time when that unit becomes non-compliant with the late arrival policy.

The policies described above can determine the correct starting point for reading a data stream so as to produce correct output from a given output start time, can generate output promptly (with low latency) when input from a given source is not disrupted, can generate output when events from a given source stop arriving, can clean up state for event sources that no longer produce events and can parallelize event processing whenever possible, without allowing parallelism to affect the end results.

Figure 2A:
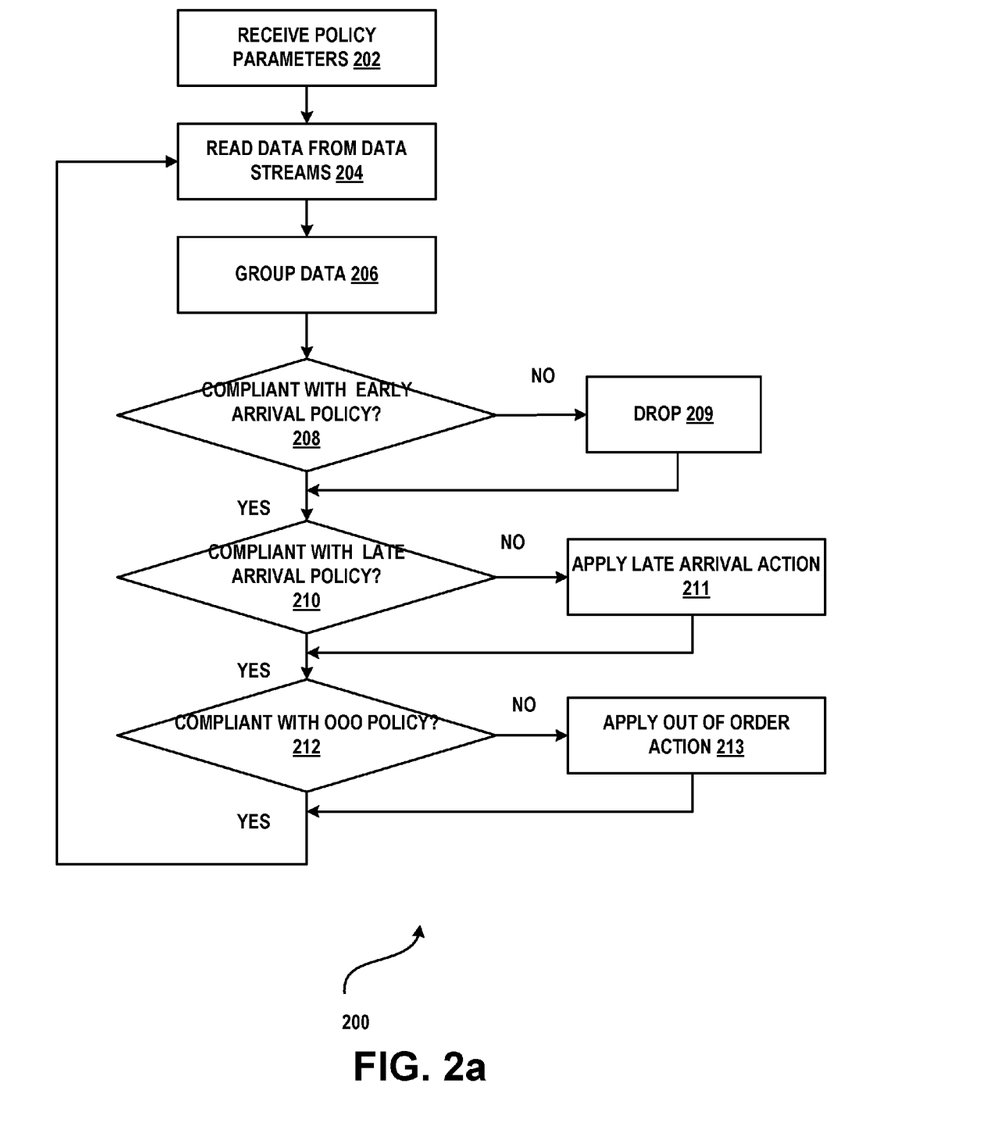
FIG. 2a illustrates an example of a method 200 for handling out of order data in accordance with aspects of the subject matter disclosed herein.

FIG. 2a illustrates an example of a method 200 for handling out of order events in accordance with aspects of the subject matter described herein. The method described in FIG. 2a can be practiced by a system such as but not limited to the one described with respect to FIG. 1. While method 200 describes a series of operations that are performed in a sequence, it is to be understood that method 200 is not limited by the order of the sequence depicted. For instance, some operations may occur in a different order than that described. In addition, one operation may occur concurrently with another operation. In some instances, not all operations described are performed.

At operation 202 policy parameters are received (e.g., from a user). Policy parameters can include any combination of maximum permissible late arrival value, maximum permissible early arrival value, and/or maximum out of order amount. Pairs of parameters may define windows (e.g., a time range can be specified so that for example, data received at the streaming data processor from 0 to 2 minutes from the timestamp on the data is considered "on time"). At operation 204 streaming data can be received and/or read. At operation 206 data can be grouped, as described more fully above. At operation 208 data can be evaluated for compliance with an early arrival policy, as described more fully above. In response to determining that the data is non-compliant with the early arrival policy, the data can be dropped at operation 209. In response to determining that the data is compliant with the early arrival policy, processing can continue at operation 210. At operation 210 data can be evaluated for compliance with a late arrival policy. In response to determining that the data is non-compliant with the late arrival policy, a late arrival noncompliance action can be applied to the data at operation 211 as described more fully above. In response to determining that the data is compliant with the late arrival policy, processing can continue at operation 212. At operation 212 data can be evaluated for compliance with an out of order policy. In response to determining that the data is noncompliant with the out of order policy, an out of order non-compliance action can be applied to the data at operation 213 as described more fully above. In response to determining that the data is compliant with the out of order policy, processing can continue at operation 204.

Figure 2B:
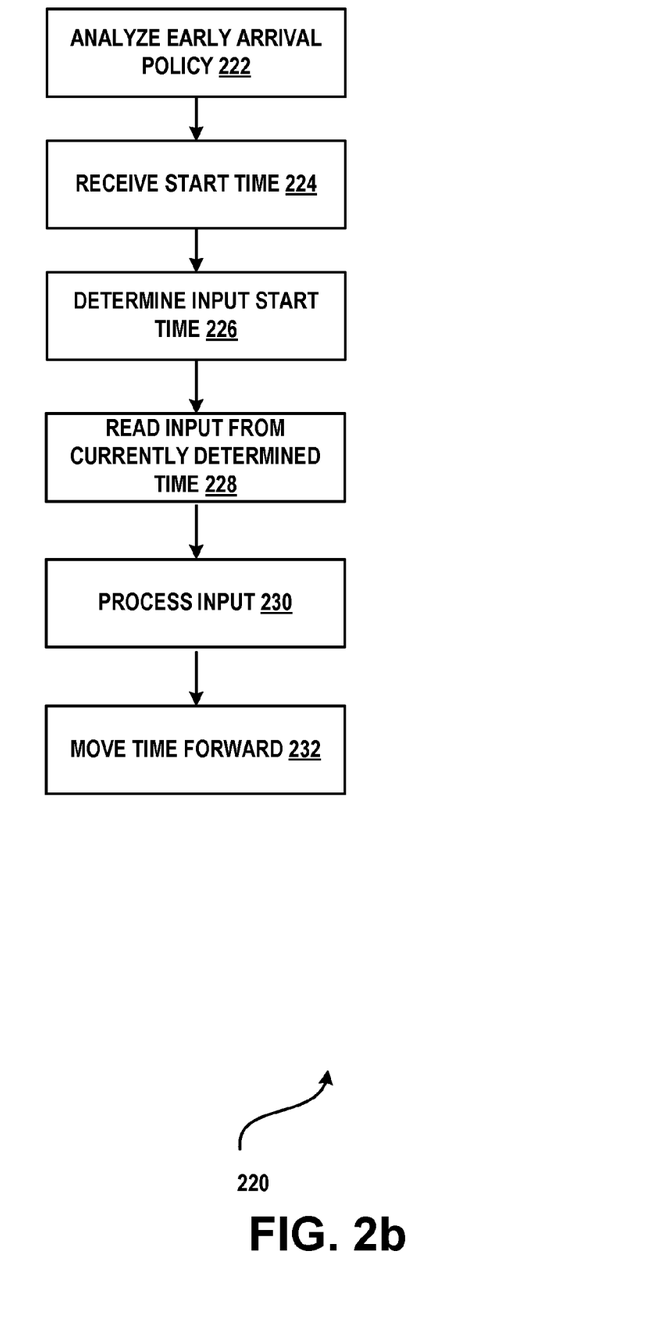
FIG. 2b illustrates an example of a method 220 determining starting point using early arrival policy in accordance with aspects of the subject matter disclosed herein.

FIG. 2b illustrates an example of a method 220 for determine a starting point for reading recorded data stream data using the early arrival policy in accordance with aspects of the subject matter described herein. The method described in FIG. 2b can be practiced by a system such as but not limited to the one described with respect to FIG. 1. While method 220 describes a series of operations that are performed in a sequence, it is to be understood that method 220 is not limited by the order of the sequence depicted. For instance, some operations may occur in a different order than that described. In addition, one operation may occur concurrently with another operation. In some instances, not all operations described are performed.

At operation 222 the early arrival policy can be analyzed. At operation 224 a start time for the requested output can be received. At operation 226 the input start time can be determined by subtracting the maximum permissible early arrival time from a specified output start time. At operation 228 the input data stream data can be read from the current time. At operation 230 the input data can be processed. At operation 232 "time can be moved forward" to account for input. Processing can continue from operation 228. The process can continue until processing ends.

In conclusion, described herein is included a system comprising at least one processor, a memory connected to the at least one processor, and at least one program module loaded into the memory causing the at least one processor to ingest data from at least one data stream, the data comprising a plurality of units of data, each unit of data of the plurality of units of data associated with a first time comprising an associated time and a second time comprising an arrival time, the arrival time comprising a time at which a unit of data of the plurality of units of data arrives at a computing device, and to evaluate the unit of data with respect to compliance with at least a first policy and a second policy of a plurality of policies. The system may include at least one program module that in response to determining that the unit of data is noncompliant with at least one policy of the plurality of policies, applies a non-compliance action for the at least one policy to the noncompliant unit of data.

The system may include at least one program module that enforces a policy of the plurality of policies, the policy comprising an early arrival policy, wherein the early arrival policy establishes a limit comprising a maximum permissible early arrival value that determines how early the unit of data can arrive and be compliant with the early arrival policy. The system may determine that the unit of data is compliant with the early arrival policy by determining that the first time exceeds the second time by an amount that does not exceed the maximum permissible early arrival value. The system may determine that the unit of data is noncompliant with the early arrival policy by determining that the first time exceeds the second time by an amount that exceeds the maximum permissible early arrival value. The system may in response to determining the unit of data is noncompliant with the early arrival policy, drop the unit of data. The system may store the data from the at least one data stream in a queue in an arrival time sequence. The system may identify a point in the queue at which data starts being read using the early arrival policy by subtracting the maximum permissible early arrival value from a start time specified in a request for output.

The system may enforce a policy of the plurality of policies, the policy comprising a late arrival policy, the late arrival policy establishing a limit comprising a maximum permissible late arrival value that determines how late the unit of data can arrive and be compliant with the late arrival policy. The system may in response to determining that all subsequent relevant units of data are noncompliant with the late arrival policy, release output. The system may enforce a policy of the plurality of policies, the policy comprising an out of order policy, the out of order policy establishing a limit comprising a maximum permissible time variance between the arrival of a first unit of data and the arrival of a second unit of data of the data stream. The system may determine that the first unit of data is noncompliant with the out of order policy by determining that the first unit of data arrived after the second unit of data, wherein an associated time of the second unit of data precedes the associated time of the first unit of data by at least the maximum permissible time variance.

The system may evaluate a unit of data for compliance with both the first policy comprising an out of order policy and the second policy comprising a late arrival policy, the late arrival policy establishing a limit to how late the unit of data can arrive and be compliant with the late arrival policy. The system may in response to determining that all relevant subsequent units of data are noncompliant based on an arrival time of a last unit of data received, release output. The system may generate output in the absence of input when all relevant subsequent units of data are noncompliant with the late arrival policy.

Described herein is included a method comprising receiving by a processor of a computing device, a first parameter associated with a first policy of a plurality of policies for processing at least one unit of data from at least one data stream, receiving by the processor of the computing device, a second parameter associated with a second policy of the plurality of policies for processing units of data from at least one data stream, evaluating the at least one unit of data for compliance with the first policy and the second policy, in response to determining that the at least one unit of data is noncompliant with the first policy, applying an action associated with noncompliance with the first policy and in response to determining that the at least one unit of data is noncompliant with the second policy applying an action associated with noncompliance with the second policy.

The method may receive the first parameter, the first parameter comprising a maximum permissible late arrival value for the first policy, the first policy comprising a late arrival policy. The method may in response to determining that a difference of an arrival time of the at least one unit of data and an associated time of the least one unit of data exceeds the maximum permissible late arrival value, adjust the associated time of at least one unit of data. The method may receive the first parameter, the first parameter comprising a maximum permissible early arrival value for the first policy, the first policy comprising an early arrival policy, and in response to determining that an associated time of the at least one unit of data exceeds an arrival time of the unit of data by an amount that exceeds the maximum permissible early arrival value, dropping the at least one unit of data. The method may receive the first parameter, the first parameter comprising a maximum permissible late arrival value for the first policy, the first policy comprising a late arrival policy and in response to determining that an arrival time of the at least one unit of data exceeds an associated time of the unit of data by an amount that exceeds the maximum permissible late arrival value, adjust the associated time of the at least one unit of data to make the at least one unit of data minimally compliant with the late arrival policy.

The method may group data from a first sub-stream of a data stream from a first computer together in a first group and group data of a second sub-stream from a data stream from a second computer together in a second group and apply an out of order policy of the plurality of policies separately to the first group and separately to the second group. The method may discard persisted state for data sources that no longer produce data.

Described herein is included a computer-readable storage medium comprising computer-readable instructions which when executed cause at least one processor of a computing device to ingest data from at least one data stream, the data comprising a plurality of units of data, each unit of data of the plurality of units of data associated with a first time comprising an associated time and a second time comprising an arrival time, the arrival time comprising a time at which the unit of data arrives at a computing device, evaluate a unit of data of the plurality of units of data with respect to compliance with at least a first policy and a second policy of a plurality of policies and evaluate the unit of data for compliance with at least one policy of the plurality of policies and in response to determining that the unit of data is noncompliant with the policy, apply a non-compliance action to the noncompliant unit of data.

Instructions on the computer-readable storage medium may group data from a first sub-stream together in a first group and group data from a second sub-stream together in a second group and apply an out of order policy of the plurality of policies separately to the first group and separately to the second group. Instructions on the computer-readable storage medium may enforce a policy of a plurality of policies, the policy comprising an early arrival policy, wherein the early arrival policy establishes a limit comprising a maximum permissible early arrival value that determines how early the unit of data can arrive and be compliant with the early arrival policy, determine that the unit of data is noncompliant with the early arrival policy by determining that the associated time of the unit of data exceeds the arrival time of the unit of data by an amount that exceeds the maximum permissible early arrival value and in response to determining a unit of data of the plurality of units of data is noncompliant with the early arrival policy, drop the unit of data.

Instructions on the computer-readable storage medium may discard persisted state for data sources that no longer produce data. Instructions on the computer-readable storage medium may enforce a policy of the plurality of policies, the policy comprising a late arrival policy, the late arrival policy establishing a limit comprising a maximum permissible late arrival value that determines how late the unit of data can arrive and be compliant with the late arrival policy and in response to determining that all subsequent relevant units of data are noncompliant with the late arrival policy, release output. Instructions on the computer-readable storage medium may read a unit of data from the at least one data stream, the unit of data comprising an event.

Example of a Suitable Computing Environment

Figure 3:
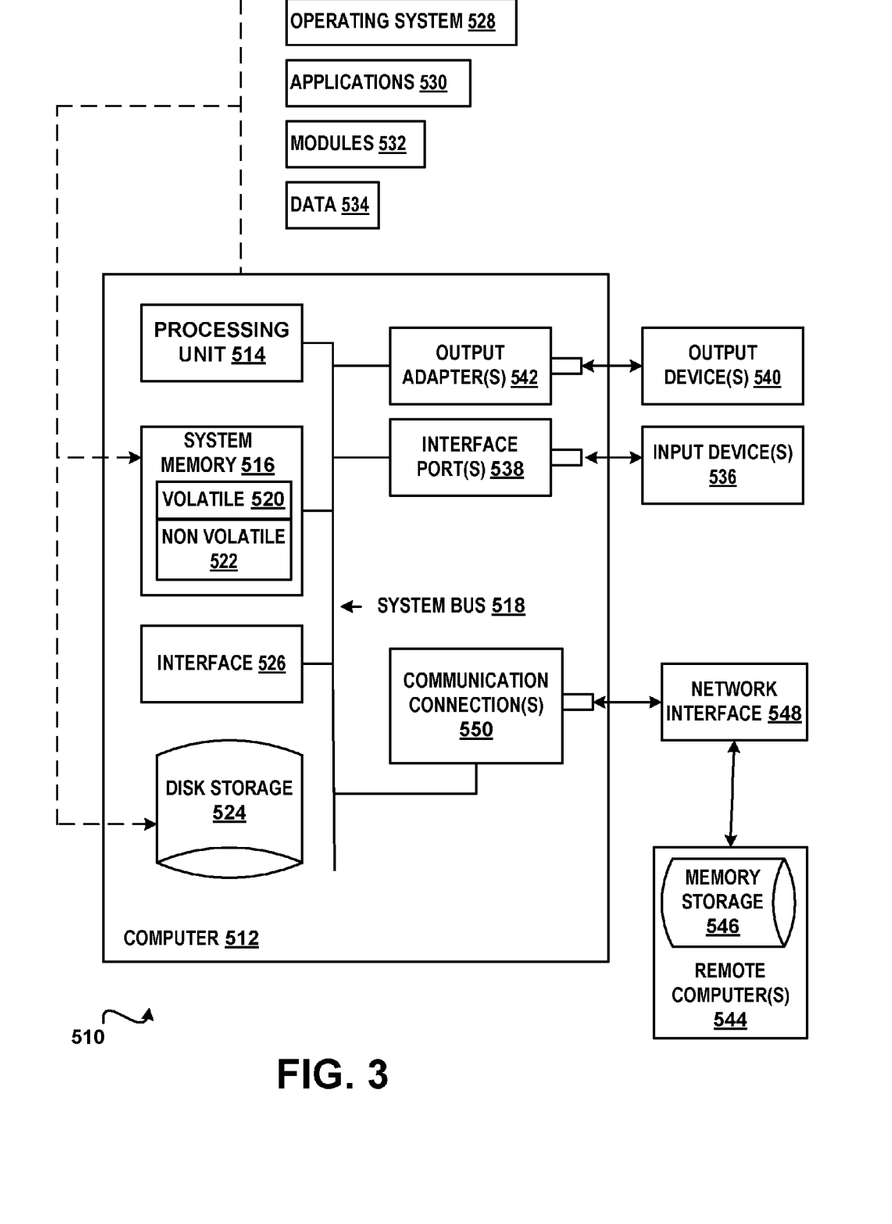
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor; and
   a memory connected to the at least one processor;
   the at least one processor configured to:
   ingest data from at least one data stream, the data comprising a plurality of units of data, each unit of data of the plurality of units of data associated with a first time comprising an associated time and a second time comprising an arrival time, the arrival time comprising a time at which a unit of data of the plurality of units of data arrives at a computing device;
   evaluate a unit of data from the at least one data stream with respect to compliance with at least a first policy and a second policy of a plurality of policies, wherein the plurality of policies includes an early arrival policy that indicates a maximum early arrival time by which data from the at least one data stream can arrive and be compliant with the early arrival policy, a late arrival policy that indicates a maximum late arrival time by which data from the at least one data stream can arrive and be compliant with the late arrival policy, and an out-of-order policy that indicates a maximum amount of time by which events in a sub-stream or group of the at least one data stream can arrive out-of-order and be compliant with the out-of-order policy, wherein the plurality of policies determine a starting point for reading the at least one data stream to produce output;
   in response to determining that the unit of data is non-compliant with the first policy and/or the second policy, apply a non-compliance action for the unit of data; and
   in response to determining that the unit of data is compliant with the first policy and the second policy, produce output from the at least one data stream starting at an output time that complies with the first policy and the second policy.

2. The system of claim 1, wherein the at least one processor is further configured to apply at least one of the first policy or the second policy separately to different sub-streams within the at least one data stream.

3. The system of claim 2, wherein the at least one processor is further configured to:
   enforce the early arrival policy, wherein the early arrival policy:
   establish a limit comprising a maximum permissible early arrival value that determines how early the unit of data can arrive and be compliant with the early arrival policy;
   determine that the unit of data is compliant with the early arrival policy by determining that the first time exceeds the second time by an amount that does not exceed the maximum permissible early arrival value;
   determine that the unit of data is noncompliant with the early arrival policy by determining that the first time exceeds the second time by an amount that exceeds the maximum permissible early arrival value; and in response to determining the unit of data is noncompliant with the early arrival policy, drop the unit of data.

4. The system of claim 3, wherein the at least one processor is further configured to:
store the data from the at least one data stream in a queue in an arrival time sequence; and
identify a point in the queue at which data starts being read using the early arrival policy by subtracting the maximum permissible early arrival value from a start time specified in a request for output.

5. The system of claim 2, wherein the at least one processor is further configured to:
enforce the late arrival policy, the late arrival policy establishing a limit comprising a maximum permissible late arrival value that determines how late the unit of data can arrive and be compliant with the late arrival policy; and
in response to determining that all subsequent relevant units of data are noncompliant with the late arrival policy, releases the output.

6. The system of claim 5, wherein the at least one processor is further configured to:
generate output in the absence of input when all relevant subsequent units of data are noncompliant with the late arrival policy.

7. The system of claim 2, wherein the at least one processor is further configured to:
enforce the out of order policy, the out of order policy establishing a limit comprising a maximum permissible time variance between the arrival of a first unit of data and the arrival of a second unit of data of the data stream; and
determine-that the first unit of data is noncompliant with the out of order policy by determining that the first unit of data arrived after the second unit of data, wherein an associated time of the second unit of data precedes the associated time of the first unit of data by at least the maximum permissible time variance.

8. The system of claim 7, wherein the at least one processor is further configured to:
evaluate a unit of data for compliance with both the first policy comprising an out of order policy and the second policy comprising a late arrival policy, the late arrival policy establishing a limit to how late the unit of data can arrive and be compliant with the late arrival policy; and
in response to determining that all relevant subsequent units of data are noncompliant based on an arrival time of a last unit of data received, release the output.

9. A method comprising:
receiving by a processor of a computing device, a first parameter associated with a first policy of a plurality of policies for processing at least one unit of data from at least one data stream of a plurality of data streams;
receiving by the processor of the computing device, a second parameter associated with a second policy of the plurality of policies for processing units of data from the at least one data stream;
evaluating the at least one unit of data for compliance with the first policy and the second policy;
in response to determining that the at least one unit of data is noncompliant with the first policy, applying an action associated with noncompliance with the first policy; and
in response to determining that the at least one unit of data is noncompliant with the second policy, applying an action associated with noncompliance with the second policy;
wherein the plurality of policies includes an early arrival policy that indicates a maximum early arrival time by which data from the at least one data stream can arrive and be compliant with the early arrival policy, a late arrival policy that indicates a maximum late arrival time by which data from the at least one data stream can arrive and be compliant with the late arrival policy, and an out-of-order policy that indicates a maximum amount of time by which events in a sub-stream or group of the at least one data stream can arrive out-of-order and be compliant with the out-of-order policy, wherein the plurality of policies determine a starting point for reading a data stream to produce output.

10. The method of claim 9, further comprising:
receiving the first parameter, the first parameter comprising a maximum permissible late arrival value for the first policy, the first policy comprising a late arrival policy;
in response to determining that a difference of an arrival time of the at least one unit of data and an associated time of the least one unit of data exceeds the maximum permissible late arrival value, adjusting the associated time of at least one unit of data.

11. The method of claim 9, further comprising:
receiving the first parameter, the first parameter comprising a maximum permissible early arrival value for the first policy, the first policy comprising an early arrival policy;
in response to determining that an associated time of the at least one unit of data exceeds an arrival time of the unit of data by an amount that exceeds the maximum permissible early arrival value, dropping the at least one unit of data.

12. The method of claim 9, further comprising;
receiving the first parameter, the first parameter comprising a maximum permissible late arrival value for the first policy, the first policy comprising a late arrival policy;
in response to determining that an arrival time of the at least one unit of data exceeds an associated time of the unit of data by an amount that exceeds the maximum permissible late arrival value, adjusting the associated time of the at least one unit of data to make the at least one unit of data minimally compliant with the late arrival policy.

13. The method of claim 9, further comprising;
grouping data from a first sub-stream of a data stream from a first computer together in a first group and grouping data of a second sub-stream from a data stream from a second computer together in a second group; and
applying an out of order policy of the plurality of policies separately to the first group and separately to the second group.

14. The method of claim 9, further comprising:
discarding persisted state for data sources that no longer produce data.

15. A device, comprising:
at least one processor and a memory;
the at least one processor configured to:
ingest data from at least one data stream, the data comprising a plurality of units of data, each unit of data of the plurality of units of data associated with a first time comprising an associated time and a second time comprising an arrival time, the arrival time comprising a time at which the unit of data arrives at the device;
evaluate a unit of data of the plurality of units of data with respect to compliance with at least a first policy and a second policy of a plurality of policies;
in response to determining that the unit of data is non-compliant with the first policy and/or the second policy, apply a non-compliance action to the noncompliant unit of data; and
in response to determining that the unit of data is compliant with the first policy and the second policy, produce output from the at least one data stream starting at an output time that complies with the first policy and the second policy,
wherein the plurality of policies includes an early arrival policy that indicates a maximum early arrival time by which data from the at least one data stream can arrive and be compliant with the early arrival policy, a late arrival policy that indicates a maximum late arrival time by which data from the at least one data stream can arrive and be compliant with the late arrival policy, and an out-of-order policy that indicates a maximum amount of time by which events in a sub-stream or group of the at least one data stream can arrive out-of-order and be compliant with the out-of-order policy, wherein the plurality of policies determine a starting point for reading a data stream to produce output.

16. The device of claim 15, wherein the at least one processor is further configured to:
group data from a first sub-stream together in a first group and group data from a second sub-stream together in a second group; and
apply the out of order policy separately to the first group and separately to the second group.

17. The device of claim 15, wherein the at least one processor is further configured to:
enforce the early arrival policy, wherein the early arrival policy establishes a limit comprising a maximum permissible early arrival value that determines how early the unit of data can arrive and be compliant with the early arrival policy;
determine that the unit of data is noncompliant with the early arrival policy by determining that the associated time of the unit of data exceeds the arrival time of the unit of data by an amount that exceeds the maximum permissible early arrival value; and
in response to determining a unit of data of the plurality of units of data is noncompliant with the early arrival policy, drop the unit of data.

18. The device of claim 15, wherein the at least one processor is further configured to:
discard persisted state for data sources that no longer produce data.

19. The device of claim 15, wherein the at least one processor is further configured to:
enforce the late arrival policy, the late arrival policy establishing a limit comprising a maximum permissible late arrival value that determines how late the unit of data can arrive and be compliant with the late arrival policy; and
in response to determining that all subsequent relevant units of data are noncompliant with the late arrival policy, release the output.

20. The device of claim 15, wherein the at least one processor is further configured to:
read the unit of data from the at least one data stream, the unit of data comprising an event.

* * * * *